(12) United States Patent
Uchiyama

(10) Patent No.: US 9,211,923 B2
(45) Date of Patent: Dec. 15, 2015

(54) RUBBER CRAWLER

(75) Inventor: Shinichiro Uchiyama, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 225 days.

(21) Appl. No.: 13/997,506

(22) PCT Filed: Feb. 14, 2012

(86) PCT No.: PCT/JP2012/053434
§ 371 (c)(1),
(2), (4) Date: Sep. 18, 2013

(87) PCT Pub. No.: WO2012/111677
PCT Pub. Date: Aug. 23, 2012

(65) Prior Publication Data
US 2014/0001829 A1    Jan. 2, 2014

(30) Foreign Application Priority Data
Feb. 15, 2011  (JP) .................. 2011-029856

(51) Int. Cl.
*F16G 1/04*  (2006.01)
*B62D 55/24*  (2006.01)

(52) U.S. Cl.
CPC ................. *B62D 55/244* (2013.01)

(58) Field of Classification Search
CPC .............. F16G 1/04; F16G 1/28; F16G 7/00; B62D 55/242
USPC ............ 305/130, 15, 142, 135, 136, 195, 34, 305/120, 199, 167, 166
See application file for complete search history.

(56) References Cited

U.S. PATENT DOCUMENTS

| | | | | |
|---|---|---|---|---|
| 2,467,947 A * | 4/1949 | Skelton | .......... | 305/135 |
| 3,072,443 A * | 1/1963 | Yoe | .......... | 305/34 |
| 3,776,326 A * | 12/1973 | Davin et al. | .......... | 305/189 |
| 5,352,029 A * | 10/1994 | Nagorcka | .......... | 305/199 |
| 5,409,305 A * | 4/1995 | Nagorcka | .......... | 305/116 |
| 5,427,443 A * | 6/1995 | Muramatsu et al. | .......... | 305/166 |
| 6,129,426 A * | 10/2000 | Tucker | .......... | 305/136 |
| 6,536,854 B2 * | 3/2003 | Juncker et al. | .......... | 305/195 |
| 6,557,953 B1 * | 5/2003 | Kahle et al. | .......... | 305/135 |
| D488,171 S * | 4/2004 | Juncker et al. | .......... | D15/28 |
| 7,407,236 B2 * | 8/2008 | Fukushima | .......... | 305/171 |
| 8,245,800 B2 * | 8/2012 | Hansen | .......... | 305/120 |

(Continued)

FOREIGN PATENT DOCUMENTS

| | | |
|---|---|---|
| JP | 55-68479 A | 5/1980 |
| JP | 03-082287 U | 8/1991 |

(Continued)

OTHER PUBLICATIONS

Extended European Search Report, dated Jun. 30, 2014, issued in corresponding European Patent Application No. 12747183.7.

*Primary Examiner* — Hua Phan
(74) *Attorney, Agent, or Firm* — Sughrue Mion, PLLC

(57) ABSTRACT

Guide projections 24 of protruding profile are disposed to the peripheral inside of a rubber crawler 10 so as to project out from an inner peripheral face of a rubber resilient body 12. Each of the guide projections 24 is configured with an indented portion 26. The indented portions 26 are open in the guide projections 24 on the peripheral inside.

7 Claims, 7 Drawing Sheets

(56) References Cited

U.S. PATENT DOCUMENTS

| | | |
|---|---|---|
| 2002/0070607 A1 | 6/2002 | Edwards |
| 2005/0168069 A1* | 8/2005 | Ueno ............................ 305/171 |
| 2010/0060075 A1* | 3/2010 | Hansen .......................... 305/15 |
| 2011/0101135 A1* | 5/2011 | Korus et al. ................... 305/130 |
| 2011/0169324 A1* | 7/2011 | Ijiri ............................... 305/142 |

FOREIGN PATENT DOCUMENTS

| | | |
|---|---|---|
| JP | 6-305460 A | 11/1994 |
| JP | 2004-196189 A | 7/2004 |
| JP | 2004-276685 A | 10/2004 |
| JP | 2006-7800 A | 1/2006 |

* cited by examiner

RUBBER CRAWLER

CROSS REFERENCE TO RELATED APPLICATIONS

This application is a National Stage of International Application No. PCT/JP2012/053434 filed Feb. 14, 2012, claiming priority based on Japanese Patent Application No. 2011-029856 filed Feb. 15, 2011, the contents of all of which are incorporated herein by reference in their entirety.

TECHNICAL FIELD

The present invention relates to a rubber crawler, and in particular relates to a friction drive type rubber crawler wherein an outer peripheral surface of a drive wheel contacts an inner peripheral surface of the rubber crawler, with drive force transmitted by friction.

BACKGROUND ART

Friction drive type rubber crawlers have been proposed wherein an outer peripheral surface of a drive wheel contacts an inner peripheral surface of the rubber crawler, with drive force transmitted by friction. With rubber crawlers of this type, guide projections are provided to the inner peripheral face of an endless form crawler main body in order to guide for example the drive wheel and rollers. Lugs are formed on the outer peripheral face of the crawler main body (see Japanese Patent Application Laid-Open (JP-A) No. 2004-196189).

In such rubber crawlers, the thickness of the guide projections in the rubber crawler thickness direction is usually thicker than the thickness of the lugs. Accordingly, in cases in which the guide projections, the crawler main body, and the lugs are integrally vulcanize molded together, the points of slowest vulcanization (the points at which the smallest amount of cumulative heat is received from the mold) are deep portions within the guide projections. There is accordingly a need to continue vulcanization until the points of slowest vulcanization reach a specific degree of vulcanization in order to achieve specific rubber properties in the rubber crawler. Since increasing the vulcanization time raises manufacturing costs, a reduction in the vulcanization time is desired.

A reduction in the vulcanization time can be achieved by reducing the height of the guide projections, however it is necessary to secure a certain degree of height for the guide projections in order for the guide projections to be contacted by the drive wheel and the rollers in the crawler width direction, so as to guide the drive wheel and the rollers. It is moreover difficult to simply reduce the size of the guide projections from the perspective of durability.

DISCLOSURE OF INVENTION

Technical Problem

In consideration of the above circumstances, an object of the present invention is to provide a friction drive type rubber crawler enabling a reduction in the vulcanization time whilst still maintaining durability and anti-disengagement characteristics.

Solution to Problem

A rubber crawler according to a first aspect of the present invention includes: a rubber resilient body configured in an endless form; plural guide projections formed at a rubber resilient body width direction center so as to project out from an inner periphery of the rubber resilient body, the guide projections being disposed mutually separated from each other at a specific distance around a rubber resilient body circumferential direction, and each of the guide projections being configured with an indented portion that is open towards a rubber resilient body peripheral inner side; a pair of contact drive faces that are configured on an inner peripheral face of the rubber resilient body at both width direction outer sides of the guide projections, and that contact an outer periphery of a drive wheel to transmit drive force by friction; and plural lugs formed at an outer peripheral face of the rubber resilient body.

In the rubber crawler of the first aspect, the contact drive faces on the inner peripheral face of the rubber resilient body configured at both the width direction outsides of the guide projections contact the outer periphery of the drive wheel to transmit drive force by friction. Each of the guide projections is configured with the indented portion that is open towards the rubber resilient body peripheral inside. Accordingly, during vulcanization molding the mold is disposed along the indented portion, thereby moving the points of slowest vulcanization to the rubber resilient body side, and thereby enabling the vulcanization time to be reduced.

Moreover, anti-disengagement characteristics and durability can be maintained since the height of the guide projections themselves is secured at portions not configured with the indented portions.

In a rubber crawler of a second aspect of the present invention, the guide projections have the indented portions penetrating therethrough in the circumferential direction.

The volume of the guide projections can be efficiently reduced, enabling a reduction in the vulcanization time, whilst still securing the surface area of the side faces of the guide projections that contact the drive wheel and rollers, due to configuring the indented portions so as to penetrate through the guide projections in the circumferential direction.

In a rubber crawler of a third aspect of the present invention, a reinforcement member is disposed along each of the indented portions of the guide projections.

The durability of the guide projections can be increased due to thus disposing the reinforcement members.

In a rubber crawler of a fourth aspect of the present invention, the reinforcement member includes a projection portion that projects out from the indented portion.

The reinforcement member to be positioned in the mold, and displacement of the reinforcement member during vulcanization molding can be prevented, due to providing the projection portion to the reinforcement member.

In a rubber crawler of a fifth aspect of the present invention, the reinforcement member is made out of metal.

Heat in the mold can thereby be more readily transmitted to the rubber, and the vulcanization time can be further reduced, due to making the reinforcement member out of metal.

Advantageous Effects of Invention

As described above, the rubber crawler of the present invention can achieve a reduction in the vulcanization time whilst still maintaining durability and anti-disengagement characteristics due to configuring the guide projections with the indented portions open towards the rubber resilient body peripheral inside.

BEST MODE FOR CARRYING OUT THE INVENTION

Detailed explanation follows regarding a rubber crawler according to the present invention, with reference to the drawings.

Figure 1:
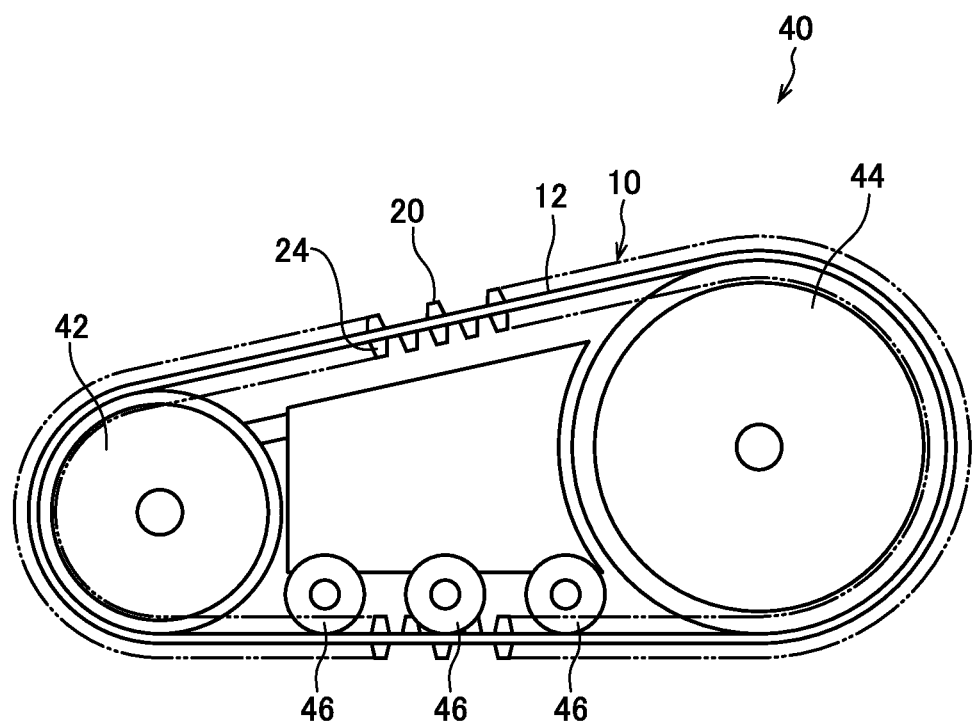
FIG. 1 is a side view illustrating a state in which a rubber crawler according to a present exemplary embodiment is mounted to a machine main body.

FIG. 1 illustrates a state in which a rubber crawler 10 according to an exemplary embodiment of the present invention is mounted on a machine main body 40. The rubber crawler of the present exemplary embodiment does not have a core, being what is referred to as a coreless type rubber crawler. The rubber crawler 10 is entrained around a drive wheel 42 and a following wheel 44 of the machine main body 40. The rubber crawler 10 is also entrained around plural rollers 46 provided in a row between the drive wheel 42 and the following wheel 44. The rollers 46 support the weight of the machine main body 40, and also guide guide projections 24, described later.

The rubber crawler 10 includes a rubber resilient body 12, lugs 20, and the guide projections 24.

Figure 2:
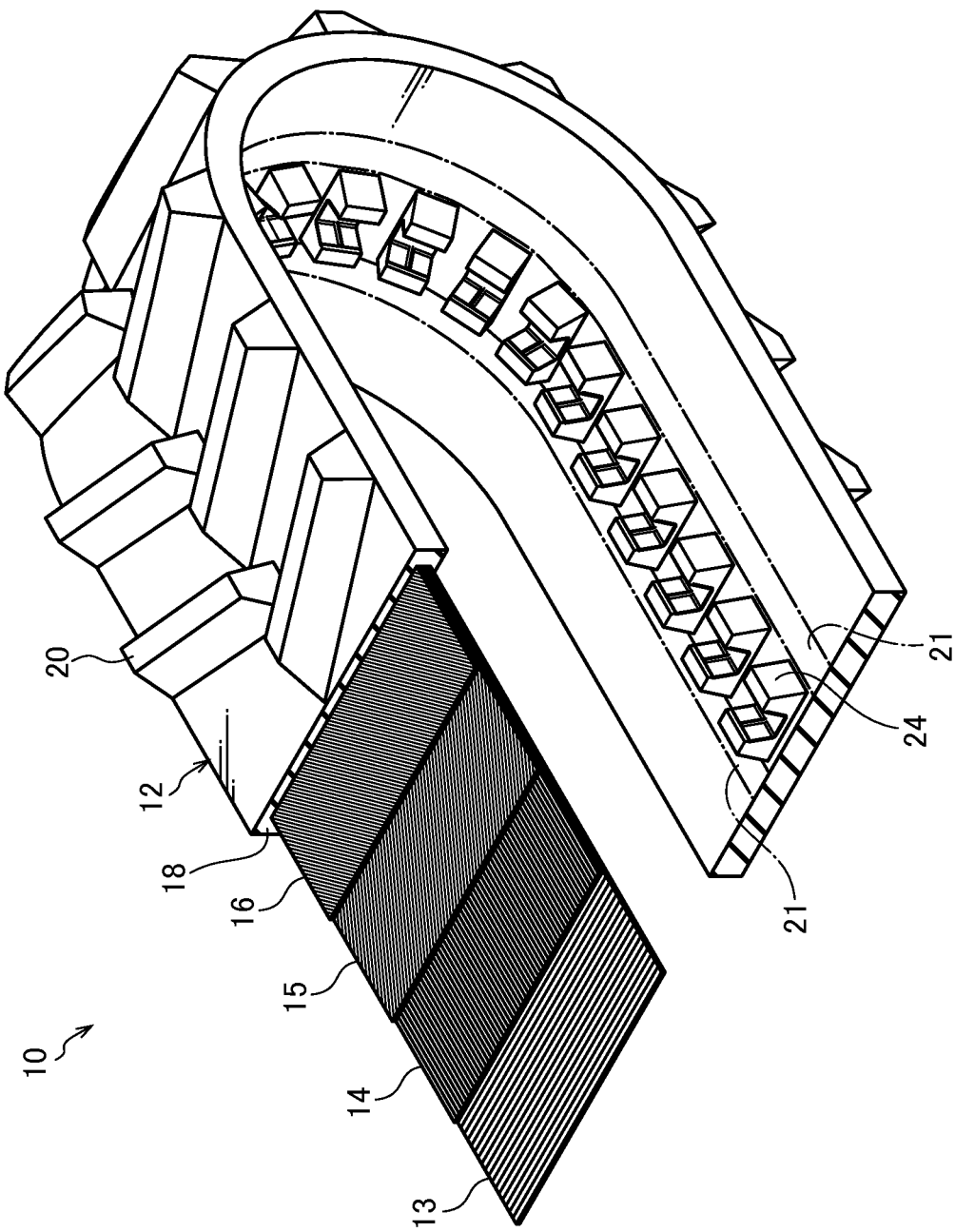
FIG. 2 is a perspective view illustrating a rubber crawler according to the present exemplary embodiment.

The rubber resilient body 12 is configured in an endless form, and as illustrated in FIG. 2, includes a ply cord layer 13, a main cord layer 14, a first bias cord layer 15 and a second bias cord layer 16. The ply cord layer 13, the main cord layer 14, the first bias cord layer 15 and the second bias cord layer 16, each of endless form, are layered in this sequence on the peripheral inside of the rubber resilient body 12.

The ply cord layer 13 is configured by cord embedded along the rubber resilient body 12 width direction at 0° (at 90° with respect to the circumferential direction). The main cord layer 14 is configured by steel cord embedded along the rubber resilient body 12 circumferential direction. The first bias cord layer 15 is configured by cord embedded at an angle to the rubber resilient body 12 circumferential direction, and the second bias cord layer 16 is configured by cord embedded in the opposite direction with respect to the circumferential direction to the cord of the first bias cord layer 15. An outer rubber layer 18 covers the outsides of the layered ply cord layer 13, main cord layer 14, first bias cord layer 15 and second bias cord layer 16.

The outer peripheral face of the rubber resilient body 12 is formed with the lugs 20 of protruding profile that form a ground contact face. The lugs 20 are disposed regularly around the circumferential direction, the lugs 20 gripping the road surface to move the machine main body 40 when the rubber crawler 10 is driven and circulated.

The peripheral inside of the rubber crawler 10 is disposed with the guide projections 24 of protruding profile that project from the inner peripheral face of the rubber resilient body 12. Plural of the guide projections 24 are disposed around the circumferential direction S at the width direction W center of the rubber resilient body 12. The plural guide projections 24 are mutually separated from each other at a specific distance around the circumferential direction S.

Figure 3:
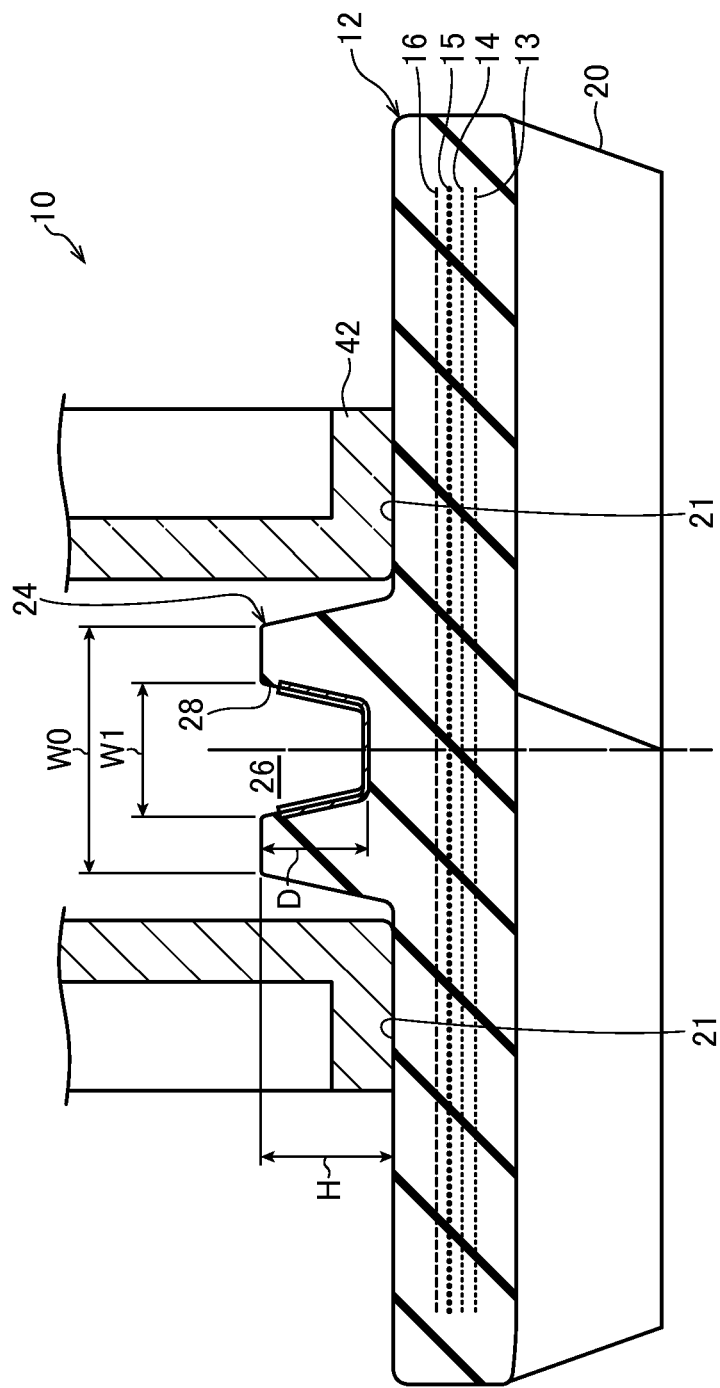
FIG. 3 is a cross-section illustrating a rubber crawler according to the present exemplary embodiment.
Figure 4:
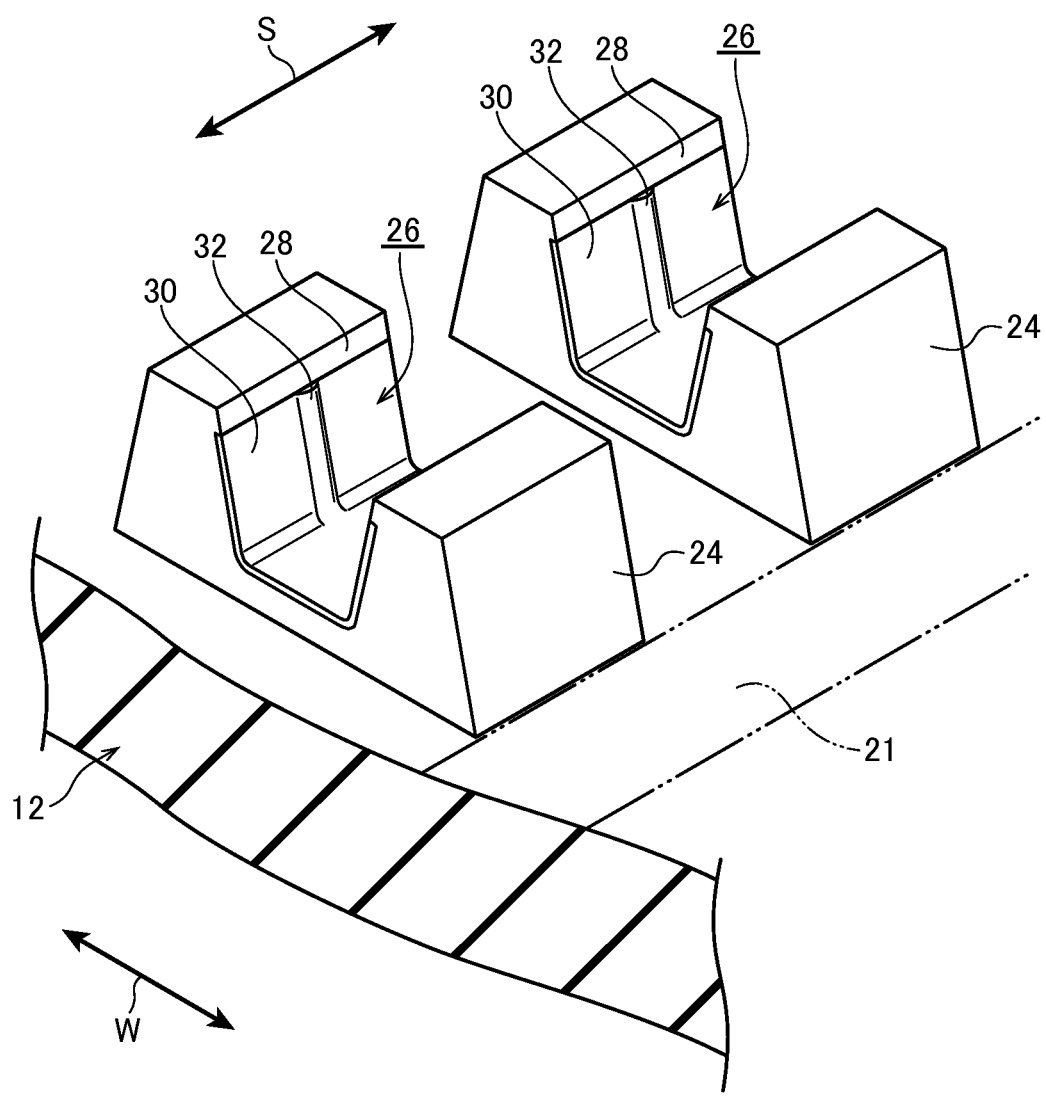
FIG. 4 is an enlarged perspective view of a guide projection of a rubber crawler according to the present exemplary embodiment.

As illustrated in FIG. 3 and FIG. 4, each of the guide projections 24 is configured with an indented portion 26. The indented portions 26 are open towards the peripheral inside of the guide projections 24, and penetrate through the guide projections 24 along the circumferential direction S. Inner walls 28 of the indented portions 26 are inclined such that the opening becomes larger on progression from a bottom side of the indented portions 26 towards the apex face side of the guide projections 24.

A depth D of the indented portion 26 from the apex face of the guide projections 24 is set smaller than a height H of the guide projections 24 (the length from the inner peripheral face of the rubber resilient body 12 to the apex face of the guide projections 24). The depth D is preferably in the region of 25% to 100% of the height H. A width direction W width W1 of the opening portions of the indented portions 26 is moreover preferably in the region of 10% to 80% of a width W0 of the apex face of the guide projections 24.

The indented portions 26 are each provided with a reinforcement member 30. The reinforcement members 30 are configured in a plate shape, and have a U-shape along the indented portion 26. The reinforcement members 30 are adhered to the wall faces configuring the indented portions 26 such that the reinforcement members 30 are in the same plane as the inner walls 28 of the indented portions 26. Projection portions 32 are formed along the rubber crawler 10 thickness direction at the circumferential direction S centers of the portions of the reinforcement members 30 that correspond to the inner walls 28. The projection portions 32 have a bent configuration such that the surface of the reinforcement members 30 is ridged.

The two leading edges configuring the U-shape of the reinforcement members 30 are disposed at positions further towards a bottom portion side of the indented portions 26 than the apex face of the guide projections 24. The guide projection 24 apex face sides of the inner walls of the indented portions 26 are accordingly exposed rubber portions that are not covered by the reinforcement members 30. The reinforcement members 30 are moreover disposed so as to cover from one end to the other end of the indented portions 26 in the circumferential direction S.

The reinforcement members 30 are preferably made of metal, and for example iron or aluminum may be employed.

A pair of contact drive faces 21 are configured along the circumferential direction S on both the width direction W outsides of the guide projections 24. As illustrated in FIG. 3, the contact drive faces 21 are portions where the inner peripheral face of the rubber resilient body 12 contacts an outer periphery 42A of the drive wheel 42, the following wheel 44, and the rollers 46. Since the rubber crawler 10 is entrained around the drive wheel 42, the following wheel 44 and the following wheel 44 at a specific tension, frictional force arises between the drive wheel 42 and the contact drive faces 21, and drive force of the drive wheel 42 is transmitted to the rubber crawler 10.

As described above, the rubber crawler 10 of the present exemplary embodiment is driven by friction between the drive wheel 42 and the contact drive faces 21. The indented portions configured between mutually adjacent of the guide projections 24 around the circumferential direction S do not engage with the drive wheel.

Next, explanation follows regarding a manufacturing method of the rubber crawler 10 of the present exemplary embodiment.

Figure 5:
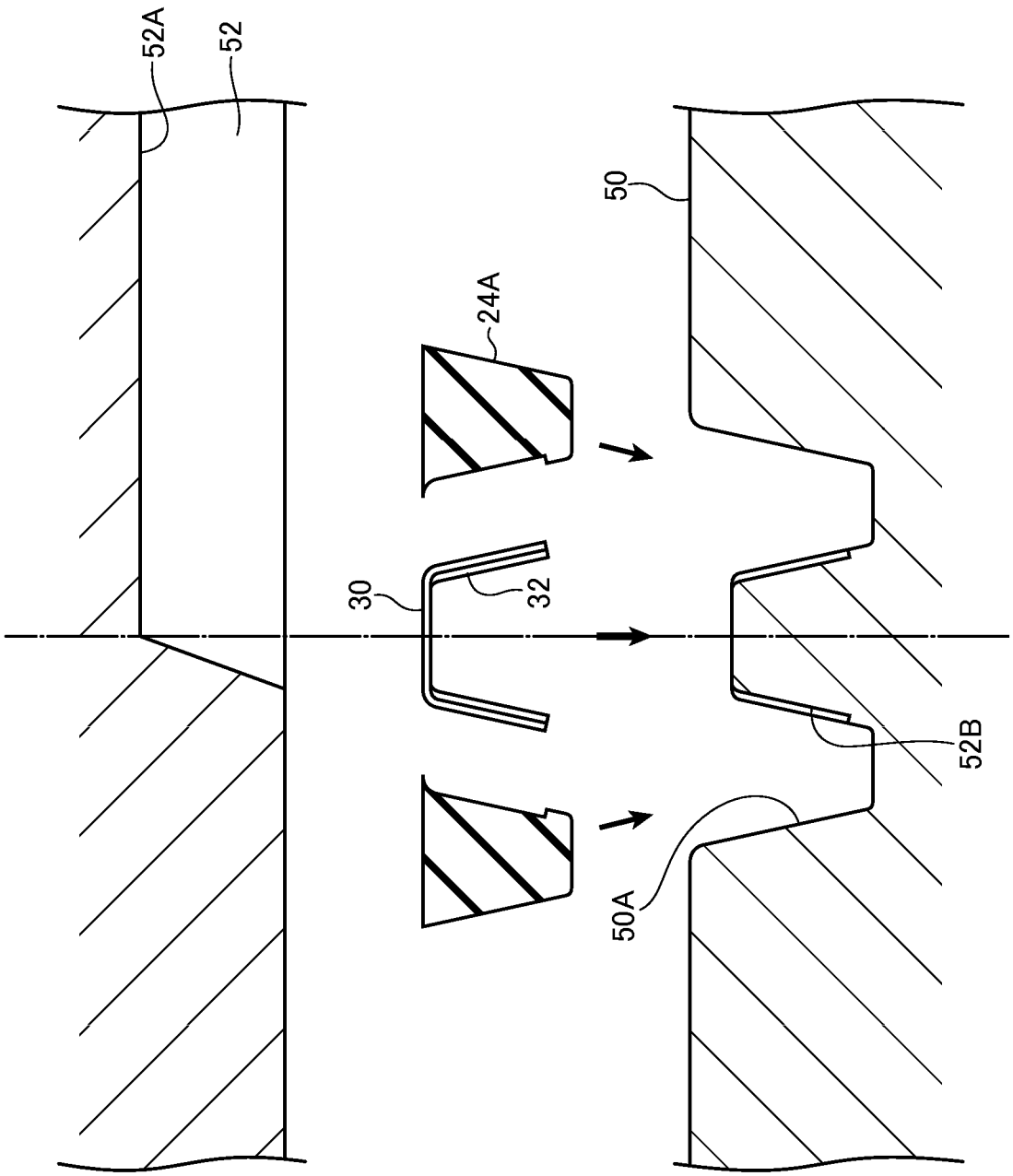
FIG. 5 is a drawing to explain a manufacturing method of a rubber crawler according to the present exemplary embodiment.

As illustrated in FIG. 5, manufacture of the rubber crawler 10 is performed employing an upper mold 50 formed with indented portions 50A corresponding to the lugs 20, and a lower mold 52 formed with indented portions 52A corresponding to the guide projections 24. The rubber resilient body 12, the lugs 20, and the guide projections 24 are integrally vulcanized together. Wall face portions configuring the indented portions 52A of the lower mold 52 are formed with groove portions 52B at positions corresponding to the projection portions 32 of the reinforcement members 30.

During vulcanization molding, the reinforcement members 30 are positioned and placed in the indented portions 52A of the lower mold 52 such that the projection portions 32 fit into the groove portions 52B, and non-vulcanized rubber pieces 24A that will form the guide projections 24 are then placed in the indented portions 52 over the reinforcement members 30. Then the ply cord layer 13, the main cord layer 14, the first bias cord layer 15 and the second bias cord layer 16 processing, that are respectively in a non-vulcanized state and are formed in sheet shapes with cords covered by non-vulcanized rubber, are layered in sequence from the lower mold 52 side (not illustrated in the drawings). Non-vulcanized rubber pieces (not shown in the drawings) that will form the lugs 20 are then placed in the indented portions 50A of the upper mold 50, and the upper and lower molds 50, 52 are closed. In this state, vulcanization processing is then performed for a specific time and at a specific temperature.

Since the rubber crawler 10 of the present exemplary embodiment is formed with the indented portions in the guide projections 24, the points of slowest vulcanization move to the rubber resilient body 12 side, enabling the vulcanization time to be reduced.

Moreover, anti-disengagement characteristics with respect to the drive wheel 42, the following wheel 44 and the rollers 46 can be maintained since the height of the guide projections 24 themselves is secured at portions not configured with the indented portions 26, and durability can also be maintained since the contact faces with the drive wheel 42, the following wheel 44 and the rollers 46 can be secured.

Figure 6:
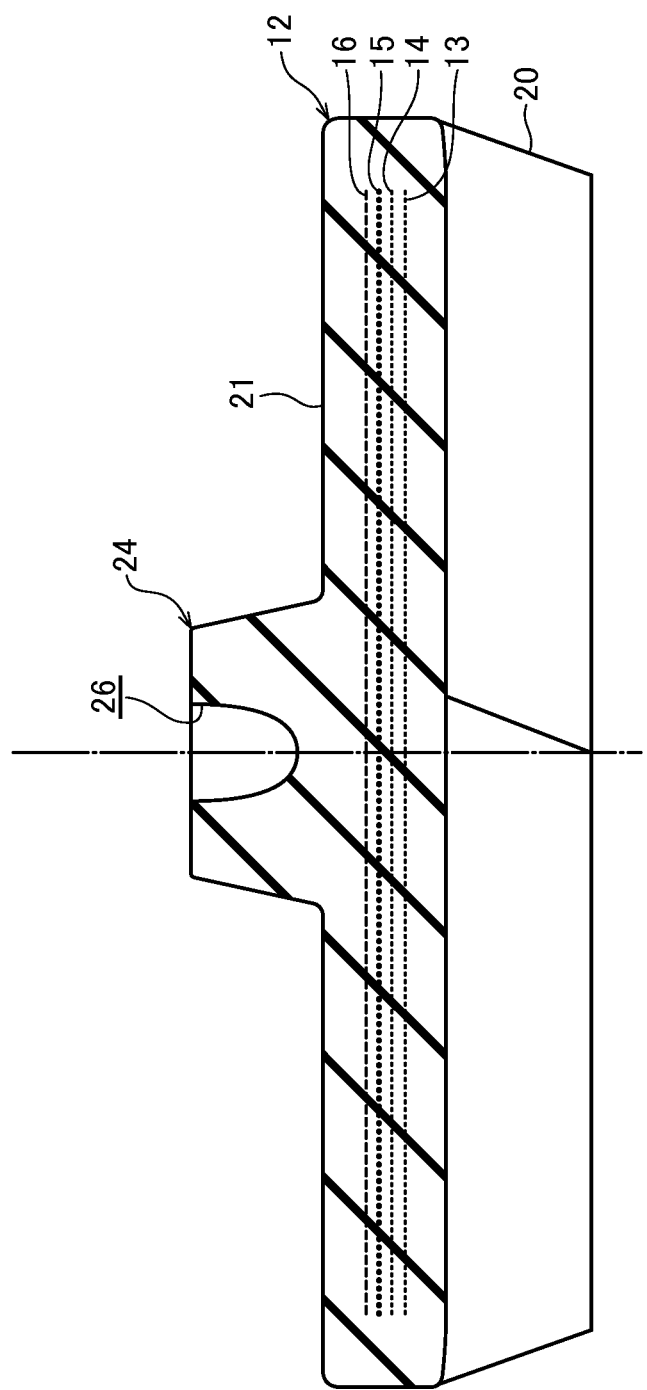
FIG. 6 is a cross-section illustrating a modified example of a guide projection of a rubber crawler according to the present exemplary embodiment.

Note that in the present exemplary embodiment, the reinforcement members 30 are provided to the indented portions 26 of the guide projections 24, however the reinforcement members 30 do not necessarily have to be provided, and as illustrated in FIG. 6, configuration may be made without the reinforcement members 30. Due to providing the reinforcement members 30 in the present exemplary embodiment, the strength of the guide projections 24 that are configured with the indented portions 26 can be reinforced. By making the reinforcement members 30 out of metal, the thermal conductivity can be increased during vulcanization processing, enabling the vulcanization time to be reduced further.

Moreover, in the reinforcement member 30 of the present exemplary embodiment, the two leading edges configuring the U-shape are disposed at a position further to the indented portion 26 bottom portion side than the apex face of the guide projections 24. Accordingly, when for example heavy force is imparted to the guide projections 24, or when the rollers 46 ride up over the guide projections 24, the reinforcement member 30 does not come into contact with for example the rollers 46, with rubber portions of the guide projections 24 coming into contact with the rollers 46. In such situations, noise would be generated if the reinforcement members 30 came into direct contact with for example the rollers 46, however such noise can be suppressed, and impact can be alleviated, due to it being the rubber portions that come into contact with for example the rollers 46.

Figure 7:
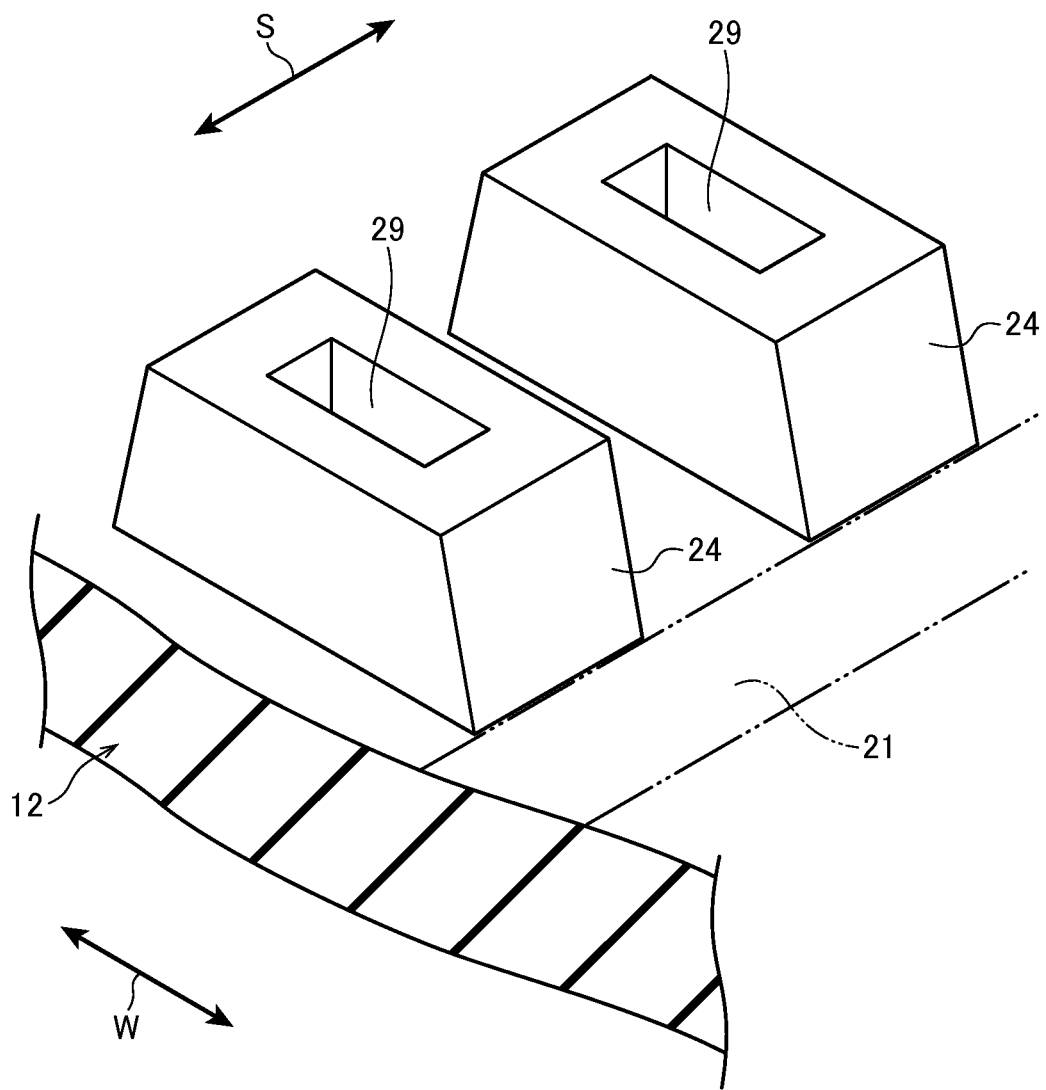
FIG. 7 is a perspective view illustrating another modified example of a guide projection of a rubber crawler according to the present exemplary embodiment.

Moreover, in the present exemplary embodiment, the indented portions 26 of the guide projections 24 are configured penetrating through along the circumferential direction S, however the indented portions may be configured as pit shaped indented portions 29 that do not penetrate through in the circumferential direction S, such as illustrated in FIG. 7.

The invention claimed is:

1. A rubber crawler comprising:
a rubber resilient body configured in an endless form;
a plurality of guide projections formed at a rubber resilient body width direction center so as to project out from an inner periphery of the rubber resilient body, the guide projections being disposed mutually separated from each other at a specific distance around a rubber resilient body circumferential direction, and each of the guide projections being configured with an indented portion that is open towards a rubber resilient body peripheral inner side;
a pair of contact drive faces that are configured on an inner peripheral face of the rubber resilient body at both width direction outer sides of the guide projections, and that contact an outer periphery of a drive wheel to transmit drive force by friction; and
a plurality of lugs formed at an outer peripheral face of the rubber resilient body,
wherein a reinforcement member having an indented shape is disposed along each of the indented portions of the guide projections.

2. The rubber crawler of claim 1, wherein the guide projections have the indented portions penetrating therethrough in the circumferential direction.

3. The rubber crawler of claim 2, wherein a reinforcement member is disposed along each of the indented portions of the guide projections.

4. The rubber crawler of claim 3, wherein the reinforcement member comprises a projection portion that projects out from the indented portion.

5. The rubber crawler of claim 1, wherein the reinforcement member comprises a projection portion that projects out from the indented portion.

6. The rubber crawler of claim 5, wherein the reinforcement member is made out of metal.

7. The rubber crawler of either claim 1, wherein the reinforcement member is made out of metal.

* * * * *